United States Patent
Uezono

(10) Patent No.: US 8,906,118 B2
(45) Date of Patent: Dec. 9, 2014

(54) METHOD FOR MANUFACTURING LITHIUM SECONDARY BATTERY

(75) Inventor: Tomoyuki Uezono, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 249 days.

(21) Appl. No.: 13/615,820

(22) Filed: Sep. 14, 2012

(65) Prior Publication Data

US 2013/0089780 A1    Apr. 11, 2013

(30) Foreign Application Priority Data

Oct. 6, 2011    (JP) ................ 2011-222311

(51) Int. Cl.
*H01M 4/04* (2006.01)
*H01M 4/583* (2010.01)
*H01M 4/64* (2006.01)
*B05D 5/12* (2006.01)
*B60K 1/00* (2006.01)

(52) U.S. Cl.
CPC ......... *H01M 4/04* (2013.01); *H01M 4/583* (2013.01); *H01M 4/64* (2013.01); *Y02E 60/122* (2013.01); *Y02T 10/7011* (2013.01)
USPC ......... 29/623.5; 429/231.95; 429/232; 429/233; 427/58; 180/65.1

(58) Field of Classification Search
USPC ......... 429/232, 231.95, 233; 427/58; 29/623.5, 623.1; 180/65.1
See application file for complete search history.

(56) References Cited

U.S. PATENT DOCUMENTS

| | | | | |
|---|---|---|---|---|
| 2005/0271940 A1* | 12/2005 | Fukunaga et al. | ............ | 429/217 |
| 2010/0297500 A1* | 11/2010 | Kawai et al. | ............... | 429/231.8 |

FOREIGN PATENT DOCUMENTS

| | | | | | |
|---|---|---|---|---|---|
| CN | 101132062 | | 2/2008 | | |
| CN | 102153066 | | 8/2011 | | |
| JP | 09213309 | A * | 8/1997 | ............. | H01M 4/04 |
| JP | 10-144302 | | 5/1998 | | |
| JP | 11144714 | A * | 5/1999 | ............. | H01M 4/04 |
| JP | 11213989 | A * | 8/1999 | ............. | H01M 4/04 |

OTHER PUBLICATIONS

Machine Translation of: JP 09213309 A, Naruto, Aug. 15, 1997.*
Machine Translation of: JP 11144714 A, Adachi et al., May 28, 1999.*
Machine Translation of: JP 11213989 A, Masaki et al., Aug. 6, 1999.*
Machine Translation of: JP 10144302 A, Matsueda et al., May 29, 1998.*

* cited by examiner

*Primary Examiner* — Kenneth Douyette
(74) *Attorney, Agent, or Firm* — Finnegan, Henderson, Farabow, Garrett & Dunner, LLP

(57) ABSTRACT

A method for manufacturing a lithium secondary battery includes a first step of dispersing a conductive material in a solvent to prepare a conductive slurry; and a second step of mixing the prepared conductive slurry, a positive electrode active material and a binder to prepare a positive electrode mixture layer-forming slurry; wherein the first step is conducted so that a ratio of a particle size at 10% accumulation to a particle size at 90% accumulation, which are based on a particle size distribution measurement of the conductive material, is 10 or more and 200 or less.

13 Claims, 3 Drawing Sheets

METHOD FOR MANUFACTURING LITHIUM SECONDARY BATTERY

INCORPORATION BY REFERENCE

The disclosure of Japanese Patent Application No. 2011-222311 filed on Oct. 6, 2011 including the specification, drawings and abstract is incorporated herein by reference in its entirety.

BACKGROUND OF THE INVENTION

1. Field of the Invention

The present invention relates to a method for manufacturing a lithium secondary battery (typically a lithium ion battery). In more detail, the present invention relates to a method for manufacturing a positive electrode of the battery.

2. Description of Related Art

A lithium secondary battery including a lithium ion battery is smaller in size, lighter in weight and higher in the energy density than a conventional battery. From these features, the lithium secondary battery is widely used in a commercial field (a power source for personal computers and portable terminals). Further, from the viewpoint of high output density, the lithium secondary battery can be used also as a high-output power source for driving vehicles such as hybrid automobiles (HV).

A lithium secondary battery (typically, a lithium ion battery) like this includes a battery case, an electrode body of a positive electrode and a negative electrode housed in the battery case, and an electrolyte (typically, an electrolyte solution). Each of the positive electrode and negative electrode includes, on a current collector, an electrode mixture layer (specifically, a positive electrode mixture layer and a negative electrode mixture layer) mainly made of an active material capable of reversibly storing and releasing a charge carrier (typically, lithium ions). For example, in a positive electrode of a lithium secondary battery, when a slurry-like (including paste-like, and ink-like) composition (a positive electrode mixture layer-forming slurry) prepared by mixing a positive electrode active material, a high-conductivity material (conductive material) and a binder in an appropriate solvent is coated on a positive electrode current collector, a positive electrode mixture layer is formed.

The conductive material is added to improve the conductivity in a positive electrode mixture layer, and, in a general lithium secondary battery, conductive carbon fine particles (typically, carbon black) are preferably used. However, since the conductive carbon fine particles have a small primary particle size such as several tens nanometers and are strong in cohesion force, it is difficult to uniformly disperse in a solvent. During preparation of a positive electrode mixture layer-forming slurry, by increasing an amount of a solvent used for example, the dispersibility of a carbon powder can be enhanced. However, when an amount of solvent is increased like this, a temperature and/or a time for drying the positive electrode mixture layer-forming slurry become unfavorably high and/or long. As a technology for solving the present problem, Japanese Patent Application Publication No. 10-144302 (JP 10-144302 A) discloses that when a positive electrode mixture layer-forming slurry is prepared, firstly, only a conductive material that is difficult to disperse is dispersed in a solvent with a media disperser (ball mill, for example), followed by mixing and kneading with an active material. According to the method, a positive electrode mixture layer-forming slurry that is free from dispersion irregularity and homogeneous can be prepared.

However, according to the study of the present inventors, when a media disperser such as described in JP No. 10-144302 A is used, since a conductive material, a solvent and a crushing medium (balls in the case of a ball mill, for example) are put together, a particle size distribution of the conductive material after dispersion becomes sharp, and when a positive electrode mixture layer-forming slurry like this is dried, a particle size distribution of the conductive material tended to be eccentrically located. Further, there was a concern that due to a strong shearing action between media, particles are disintegrated to increase the viscosity of a dispersing system or to cause excess dispersion (re-agglomeration of once-dispersed particles) thereof. An increase in the viscosity and the localization of a particle size distribution of the conductive material like this not only deteriorate the work efficiency but also unfavorably induce deterioration of battery performance (an increase in IV resistance, for example). Further, when a media disperser is used, there is a care of wear or contamination of the crushing medium; accordingly, also from the viewpoint of a manufacturing technology, a more excellent method is required.

SUMMARY OF THE INVENTION

The present invention provides a method for manufacturing a lithium secondary battery, in which when the dispersibility of a conductive material in a positive electrode mixture layer-forming slurry is improved, the battery performance is improved (low IV resistance is realized, for example).

The present invention relates to a method for manufacturing a lithium secondary battery. The method for manufacturing includes: preparing a first slurry by a dispersing treatment where a conductive material containing conductive carbon fine particles in a solvent; preparing a second slurry by mixing the first slurry with a positive electrode active material and a binder; imparting the second slurry on a positive electrode current collector to form a positive electrode mixture layer; and forming a lithium ion secondary battery provided with the current collector on which the positive electrode mixture layer is formed. Here, the dispersing treatment is conducted in such a manner that a ratio ($D_{90}/D_{10}$) of a particle size at 90% accumulation ($D_{90}$) of the conductive material to a particle size at 10% accumulation ($D_{10}$) of the conductive material. The particle size at 90% accumulation ($D_{90}$) of the conductive material and the particle size at 10% accumulation ($D_{10}$) of the conductive material are based on a particle size distribution measurement, may be 10 or more and 200 or less. Like this, firstly, only the conductive material is dispersed in a solvent to crush agglutinated conductive material. Thereby, the conductive material can be excellently dispersed in the solvent. Further, a conductive material that satisfies the particle size range has a relatively broad distribution of particle size; accordingly, the conductive material can preferably fill voids between particles of a positive electrode active material (for example, large voids are filled with coarse particles and fine voids are filled with fine particles). Accordingly, a conductive path in the positive electrode mixture layer (that is, contact area between a positive electrode active material and a conductive material) becomes excellent, and in a lithium secondary battery provided with the positive electrode mixture layer like this, the battery performance can be improved (low IV resistance is realized, for example).

The particle size at 90% accumulation ($D_{90}$) based on the particle size distribution measurement may be one half or more and twice or less a particle size at 50% accumulation ($D_{50}$) of the positive electrode active material, which is based on the particle size distribution measurement. When the dispersing treatment is performed so as to satisfy a particle size like this, voids between particles of the positive electrode active material can be preferably filled. Accordingly, in a positive electrode mixture layer, a stronger conductive path can be formed, and in a lithium secondary battery provided with the positive electrode mixture layer like this can improve the battery performance (low IV resistance is realized, for example).

The dispersing treatment may be performed so that the particle size at 90% accumulation ($D_{90}$) of the conductive material based on the particles size distribution measurement may be 5 μm or more and 60 μm or less. In a second slurry satisfying the particle size, coarse aggregates are hardly present. As a result, the coating properties on a positive electrode current collector are excellent, and a problem related to manufacturing technology (for example, clogging of filter opening and streaking during the coating) can be suppressed.

The conductive material may contain at least one kind of acetylene black, furnace black, Ketjen black, channel black, lamp black, and thermal black. These conductive materials are excellent in the conductivity and preferably used in a lithium secondary battery. However, a structural conformation where primary particles are linked tends to be formed. Accordingly, it is difficult to uniformly disperse in a solvent. However, according to the method for manufacturing of the present invention, the conductive materials can be excellently dispersed. In a lithium secondary battery provided with a positive electrode manufactured according to the method for manufacturing like this, the battery performance can be more improved (low IV resistance is realized, for example).

The first slurry may be adjusted by operating a homogenizer under the condition of a shearing speed of $30000 \text{ s}^{-1}$ or more. When a homogenizer is operated under the above condition, the dispersibility of the second slurry can be improved and a conductive material having a particle size that can improve the conductive path in the positive electrode mixture layer can be more efficiently manufactured.

The second slurry may be adjusted so that the viscosity thereof is in the range of 300 mPa·s to 5000 mPa·s. When the viscosity of the second slurry is in the range described above, the coating properties are excellent, that is, a problem of streaking, for example is difficult to occur. Accordingly, a positive electrode mixture layer can be formed with precision.

The second slurry may be adjusted so that a ratio of the conductive material contained in a positive electrode layer may be 2% by weight or more and 8% by weight or less. Further, a solvent may be removed from the positive electrode mixture layer so that a ratio of the conductive material contained in the positive electrode layer may be 2% by weight or more and 8% by weight or less. According to the method for manufacturing, by efficiently filling voids between particles of a positive electrode active material, a conductive path in the positive electrode mixture layer can be improved. Accordingly, in a lithium secondary battery provided with a positive electrode like this, without excessively adding a conductive material, the battery performance can be improved (low IV resistance is realized, for example). Further, that an amount of the conductive material can be reduced to a relatively low level means that an amount of a positive electrode active material contained in a positive electrode mixture layer can be relatively increased; accordingly, it is also effective in improving the battery capacity per volume.

In a lithium secondary battery obtained according to the method for manufacturing, a conductive path in a positive electrode mixture layer can be improved, and the battery performance can be improved (low IV resistance is realized, for example). Since the lithium secondary battery can exert high performance like this, it can be preferably used as a motor-driving power source (driving power source) mounted particularly on vehicles (typically, electric machinery such as plug-in hybrid vehicle (PHV), hybrid vehicle (HV), electric vehicle (EV), and fuel cell vehicle (FCV)).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
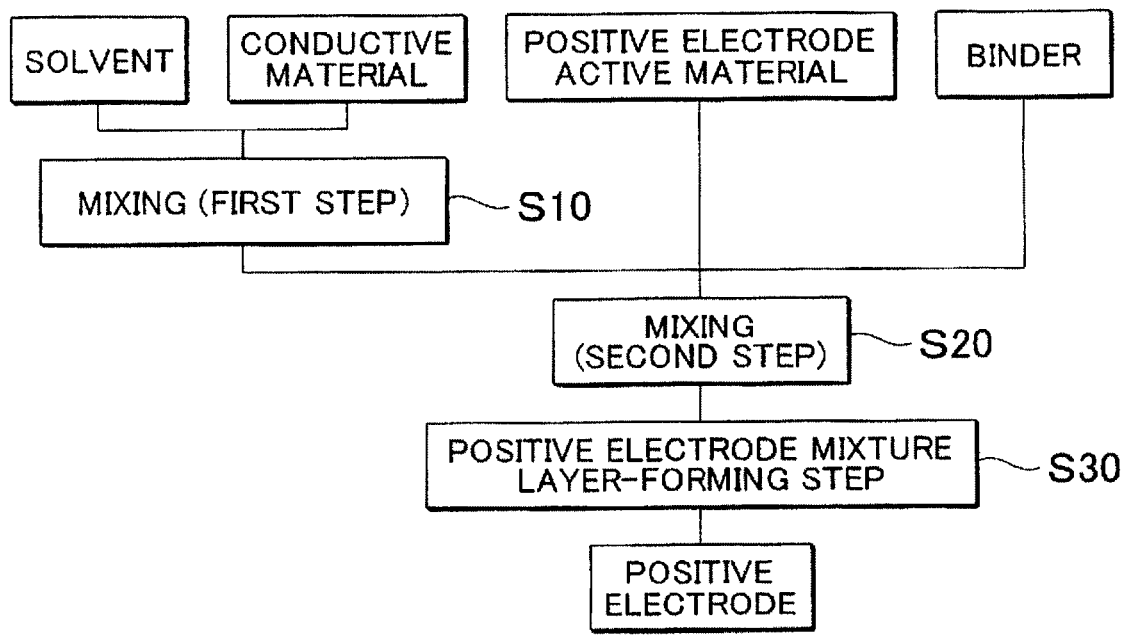
FIG. 1 is a flow-chart for describing a method for manufacturing a positive electrode of a lithium secondary battery related to an embodiment of the present invention.

In the present specification, "a secondary battery" is a term that generally means a storage device capable of repeatedly charging and discharging and includes a so-called storage battery such as a lithium secondary battery and a storage element such as an electric double layer capacitor. Further, "a lithium secondary battery" means a secondary battery that makes use of a lithium ion as an electrolyte ion and realizes charge/discharge due to charge transfer accompanying lithium ions between a positive electrode and a negative electrode. A secondary battery that is generally called a lithium ion battery (or a lithium ion secondary battery) or a lithium polymer battery is a typical example contained in a lithium secondary battery in the present specification. Further, "an active material" means a substance (compound) that is involved in storage on a positive electrode side or a negative electrode side. That is, an active material is a substance that is involved in storage and release of electrons during charge/discharge of a battery.

In the present specification, "a particle size" indicates a value derived from a particle size distribution based on volume measured by a particle size distribution measurement based on a laser diffraction scattering method. For example, a particle size at 10% accumulation ($D_{10}$) indicates a particle size at which the number of particles accumulated from a smaller particle with small particle size toward a particle with a large particle size reaches 10% of the entire number of particles in a particle size distribution based on volume. A particle size at 50% accumulation ($D_{50}$) indicates, in a particle size distribution based on volume, a particle size (median diameter) at which the number of particles accumulated from a smaller particle with small particle size toward a particle with a large particle size reaches 50% of the entire number of particles in a particle size distribution based on volume. A particle size at 90% accumulation ($D_{90}$) indicates, in a particle size distribution based on volume, a particle size at which the number of particles accumulated from a smaller particle with small particle size toward a particle with a large particle size reaches 90% of the entire number of particles in a particle size distribution based on volume. Accordingly, "a particle size" may indicate a size of primary particles themselves or may indicate a size of aggregates (secondary particles) in which many particles agglutinated.

In what follows, an embodiment of a lithium secondary battery will be described. Items that are other than those that are particularly described in the present specification and that are necessary for practicing can be grasped as design matters of a person skilled in the art based on conventional technologies in the present field. A lithium secondary battery having a structure like this can be implemented based on the content disclosed in the present specification and technical common-sense in the field.

Firstly, a method for manufacturing a lithium secondary battery of the present embodiment will be detailed. In what follows, a method for manufacturing a positive electrode for a lithium secondary battery in which a positive electrode mixture layer-forming slurry like this is used will be detailed with reference to FIG. 1.

As illustrated in FIG. 1, a method for manufacturing a positive electrode for a lithium secondary battery includes the steps of dispersing a conductive material of conductive carbon fine particles in a solvent by using a disperser to prepare a slurry-like (including paste-like and ink-like composition) composition (conductive slurry) (first step: S10); mixing the conductive slurry, a positive electrode active material and a binder to prepare a slurry-like (including paste-like and ink-like) composition (positive electrode mixture layer-forming slurry) (second step: S20); and imparting the positive electrode mixture layer-forming slurry obtained above on a positive electrode current collector to form a positive electrode mixture layer (positive electrode mixture layer-forming step; S30).

<First step; S10> A conductive material containing conductive carbon fine particles as a conductive material is added in a solvent and dispersed. As was described above, the conductive carbon fine particles are strong in cohesion force and tend to form lumps in a solvent or a plurality of the particles may agglutinate, According to the step like this, the aggregates are disintegrated and can be uniformly dispersed in a solution. The conductive material of the present embodiment contains at least one kind of conductive carbon fine particles. As the conductive carbon fine particles, what has been commonly used in manufacture of a lithium secondary battery can be used without particular restriction. Specifically, one or two or more kinds selected from various carbon blacks (acetylene black (AB), furnace black, Ketjen black (KB), channel black, lamp black, and thermal black, for example), natural graphite powder, and graphite powder can be used. When two or more kinds of the conductive materials are mixed, a network between conductive materials is developed during the first step and a second step described below and may result in high viscosity of the positive electrode mixture layer-forming slurry. Accordingly, it is preferred to substantially contain only one kind of the conductive material. Further, the conductive material of the present embodiment, within a limit that does not remarkably damage the effect of the present invention, may include a composition other than the conductive carbon fine particles as required. Specific examples include carbon fibers (manufactured by a gaseous phase growth or by a spinning method) and conductive metal powders (nickel powder, for example).

As a conductive material, the relatively smaller the particle size at 50% accumulation ($D_{50}$) of primary particles is, the larger a specific surface area is and the more advantageous is for maintaining a conductive path in the positive electrode mixture layer. In the case of the conductive carbon fine particles, a particle size at 50% accumulation ($D_{50}$) of primary particles configuring the powder is preferably in the range of about 1 nm to 500 nm (about 10 nm to 200 nm, for example, typically, about 15 nm to 100 nm). For example, conductive carbon fine particles having a particle size at 50% accumulation of primary particles of 15 nm to 60 nm (for example, 20 nm to 45 nm) can be preferably adopted. As a method for measuring a particle size of the primary particles, at least 30 or more (30 to 100 particles, for example) of primary particles are observed from an electron microscope photograph, and an average value of obtained particle sizes can be adopted. For an electron microscope, both of a scanning electron microscope and a transmission electron microscope can be used; however, a transmission electron microscope is more preferable.

Further, as a conductive material, from the viewpoint of the conductivity, a structure where primary particles are linked to a certain extent is preferred. An extent of linking of primary particles (an extent of development of structure) can be grasped by, for example, electron microscope observation. For an electron microscope, both of scanning type and transmission type electron microscopes can be used; however, a transmission electron microscope is preferred. Conductive fine particles having a structure where primary particles are linked can, when dispersed between particles of a positive electrode active material, form a conductive path between particles of the positive electrode active material while suppressing an increase in the electrical resistance; accordingly, at a less usage amount of the conductive fine particles, excellent conductivity can be imparted to the positive electrode mixture layer. On the other hand, since a structure like this tends to be entangled or curl up, it is difficult to uniformly disperse. A primary structure size (also called as an aggregate diameter) of the conductive carbon fine particles is preferably in the range of about 100 nm to 1000 nm and more preferably in the range of 200 nm to 800 nm.

Further, as a conductive material, a specific surface area thereof is preferable to be in the range of 10 $m^2$/g to 1000 $m^2$/g (for example, 10 $m^2$/g to 500 $m^2$/g, typically, 10 $m^2$/g to 100 $m^2$/g). As a specific surface area of the conductive material is large, a contact area with a positive electrode active material increases and a conductive path between particles of the positive electrode active material can be readily formed. On the other hand, since the volume of a conductive material having a large specific surface area tends to be large, there is a concern that the energy density is decreased. As the specific surface area, in general, a value measured by a nitrogen absorption method (BET specific surface area) can be adopted.

Further, a conductive material is preferable to have, for example, a quantity of absorbed hydrochloric acid of 5 to 30 ml/5 g. Here, the quantity of absorbed hydrochloric acid is a quantity measured according to a measurement method stipulated by JISK 1469 and can be grasped as a quantity related to a particle size at 50% accumulation of primary particles ($D_{50}$) and an extent of development of the structure conformation. Conductive carbon fine particles relatively abundant in the quantity of absorbed hydrochloric acid can be preferably used. For example, conductive carbon fine particles having the quantity of absorbed hydrochloric acid of 7 ml/5 g or more are preferable and conductive carbon fine particles having the quantity of absorbed hydrochloric acid of 10 ml/5 g or more are more preferable.

In addition, a conductive material having relatively small bulk density is advantageous. In the case of conductive carbon fine particles, the bulk density is, for example, 0.01 g/cm$^3$ to 0.50 g/cm$^3$, and, typically, preferably 0.01 g/cm$^3$ to 0.30 g/cm$^3$. As the bulk density, a measurement value obtained according to a measurement method stipulated in JISK 1469 can be adopted.

Here, it is preferable to use conductive carbon fine particles that satisfy one or two or more of the particle size at 50% accumulation ($D_{50}$) of the above preferred primary particles, the extent of development of structure, the specific surface area, the quantity of absorbed hydrochloric acid, and the bulk density. Examples of the conductive carbon fine particles include various kinds of carbon blacks such as acetylene black, furnace black, Ketjen black, channel black, lamp black, and thermal black. High conductivity acetylene black can be particularly preferably used. The extent of development of structure can be roughly grasped also from the bulk density and the quantity of absorbed hydrochloric acid. In the case of conductive carbon fine particles having a developed structure, the bulk density tends to be smaller, and the quantity of absorbed hydrochloric acid tends to be more abundant.

As an solvent in the present embodiment, one or two or more kinds of solvents that are used to manufacture a conventional lithium secondary battery can be used without particular restriction. The solvents like this can be roughly divided into an aqueous group and an organic solvent group. Examples of the organic solvent group include amides, alcohols, ketones, esters, amines, ethers, nitrites, cyclic ethers and aromatic hydrocarbons. More specific examples of preferable organic solvents include N-methyl-2-pyrrolidone (NMP), N,N-dimethylformamide (DMF), N,N-dimethylacetamide, 2-propanol, ethanol, methanol, acetone, methyl ethyl ketone, methyl propenic acid, cyclohexanone, methyl acetate, ethyl acetate, methyl acrylate, diethyl triamine, N,N-dimethyl aminopropylamine, acetonitrile, ethylene oxide, tetrahydrofuran (THF), dioxane, benzene, toluene, ethyl benzene, xylene dimethyl sulfoxide (DMSO), dichloromethane, trichloromethane, and dichloroethane. In particular, N-methyl-2-pyrrolidone (NMP) can be preferably used.

The larger an amount of a solvent used is, the higher the dispersibility of a carbon powder can be enhanced. However, when an amount of solvent used is increased, a drying temperature of a positive electrode mixture layer-forming slurry described below has to be set higher and/or a drying time thereof has to be set longer; accordingly, an amount of the solvent used is desirably as small as possible. When a particle size distribution of the conductive material of the present embodiment is controlled, the viscosity of a dispersion system is lower than that in the related art. Accordingly, a ratio of a solid content in the dispersion system can be enhanced and an amount of solvent used can be made less. An amount of solvent used can be set to, for example, about 50 parts by weight to 200 parts by weight relative to 10 parts by weight of the conductive material and preferably to about 100 parts by weight to 150 parts by weight relative to 10 parts by weight of the conductive material.

Further, in a solvent of the present embodiment, a material that can work as a dispersant may be added as required. Thereby, a particle size distribution of a conductive material can be more preferably controlled. As the dispersant, polymer compounds having a hydrophobic chain and a hydrophilic chain, anionic compounds having sulphate, sulfonate or phosphate, and cationic compounds such as amine can be cited. More specific examples thereof include carboxymethylcellulose, methylcellulose, ethylcellulose, hydroxypropylcellulose, polyvinyl alcohol, modified polyvinyl alcohol, polyethylene oxide, polyvinylpyrrolidone, polycarbonic acid, starch oxide and starch phosphate.

As a disperser, as long as it is a non-media type disperser (that is, a disperser that does not necessitate a dispersing media), one or two or more kinds of devices that are generally used upon manufacturing a lithium secondary battery can be used without particular restriction. Specifically, a homogenizer, a jet mill, a supersonic disperser, a planetary mixer and a disperser can be cited. In particular, a high shear homogenizer in which input of energy is large per unit a volume of solvent can be preferably used. Further, in order to generate fine microparticles to impart a width to a particle size distribution, the shearing speed is preferably set to 30000 s$^{-1}$ or more. However, a media disperser is not so suitable because there are problems such as disintegration of particles due to a strong shearing action between media and contamination due to wear of the crushing media.

A particle size of a conductive material is more advantageous to be relatively small when considering a contact area with a positive electrode active material described below. However, when simply making small, a conductive material located between particles of a positive electrode active material becomes small in size; accordingly, a conductive path between particles of the positive electrode active material tends to be narrow. That is, when a structural conformation of the conductive material is excessively disintegrated, the conductivity is deteriorated; accordingly, as described in example 1 below, the battery resistance of a lithium secondary battery manufactured with the conductive material becomes high. Accordingly, in order to establish an excellent conductive path between particles of the positive electrode active material, a conductive material having a wide particle size distribution (namely, having a broad particle size distribution) is necessary. When the conductive material is used, the conductive path in a positive electrode mixture layer can be enhanced, and the resistance of a lithium secondary battery that uses the positive electrode mixture layer like this can be reduced. As a method for obtaining conductive carbon fine particles having a specified particle size distribution, a method where dispersion conditions such as a dispersion time and a shearing speed due to the disperser are properly selected or a method where timing of addition of the conductive carbon fine particles is adjusted (for example, the conductive carbon fine particles are sequentially added upon dispersing) can be cited.

In the first mixing step, a ratio ($D_{90}/D_{10}$) of a particle size at 90% accumulation ($D_{90}$) of the conductive material and a particle size at 10% accumulation ($D_{10}$) of the conductive material, which are based on a particle size distribution measurement of the conductive material, can be set to 10 or more and 200 or less. More preferably, the conductive material is dispersed so that the $D_{90}/D_{10}$ may be 20 or more and 50 or less. In the case like this, a particle size distribution where a frequency (%) is plotted against a particle size (µm) is broad. That is, since there is a wide distribution in particle size, voids between positive electrode active materials are preferably filled (for example, large voids are filled with coarse fine particles, and in fine voids fine microparticles enter), and the conductive path (conductive route) in the positive electrode mixture layer becomes excellent. Accordingly, in a lithium secondary battery provided with the positive electrode mixture layer like this, the battery performance can be improved (low IV resistance is realized, for example).

Further, when a particle size at 90% accumulation ($D_{90}$) based on a particle size distribution measurement of the conductive material is one half or more and twice or less a value of a particle size at 50% accumulation ($D_{50}$) of the positive electrode active material, voids between particles of the positive electrode active material can be suitably tilled; accordingly, a conductive path in the positive electrode mixture layer becomes stronger. For example, when a value of a particle size at 50% accumulation ($D_{50}$) of the positive electrode active material is 10 μm, a particle size at 90% accumulation ($D_{90}$) of the conductive material based on the particle size distribution measurement is preferable to be 5 μm to 20 μm. Accordingly, in a lithium secondary battery provided with a positive electrode mixture layer like this, the battery performance can be improved (low IV resistance is realized, for example).

Further, a value of a particle size at 90% accumulation ($D_{90}$) of the conductive material based on a particle size distribution measurement can be set to 5 μm or more and 60 μm or less (typically, 5 μm or more and 50 μm or less). The positive electrode mixture layer-forming slurry that satisfies the particle size does hardly contain coarse aggregates; accordingly, dispersion is relatively easy. The coating properties on a positive electrode current collector are excellent; accordingly, problems related to manufacturing technology (streaking and clogging of filter opening, for example) can be suppressed.

<Second Step; S20> The conductive slurry, a positive electrode active material, and a binder are mixed to prepare a slurry-like composition (a positive electrode mixture layer-forming slurry). At this time, a conductive material adjusted to a specified particle size distribution, a positive electrode active material and a binder may be uniformly dispersed. According to a method for manufacturing of the present embodiment, in the first step and the second step, the same disperser may be used or different dispersers may be used. From the viewpoint of the efficiency, the same (common) disperser is preferably used. When the same disperser is used, a dispersion force of the first step and a dispersion force in the second mixing step may be the same or different from each other. When the dispersion of the conductive material and the dispersion of the positive electrode active material are separately performed, while properly controlling a particle size distribution of the conductive material, a positive electrode mixture layer-forming slurry where the positive electrode active material, the conductive material and the binder are uniformly dispersed can be obtained.

As a positive electrode active material of the present embodiment, one kind or two or more kinds of substances that have been used for a lithium secondary battery can be used without particular restriction. Examples thereof include oxides (lithium transition metal oxides) that contain lithium and a transition metal element as constituent metal elements such as lithium nickel oxide ($LiNiO_2$, for example), lithium cobalt oxide ($LiCoO_2$, for example), and lithium manganese oxide ($LiMn_2O_4$, for example) and phosphates that contain lithium and a transition metal element as constituent elements such as lithium manganese phosphate ($LiMnPO_4$) and lithium iron phosphate ($LiFePO_4$) can be cited. Among these, a positive electrode active material (typically, a positive electrode active material substantially configured of lithium nickel cobalt manganese composite oxide) mainly made of a layer-structured lithium nickel cobalt manganese composite oxide (also called as NCM. $LiNi_{1/3}Co_{1/3}Mn_{1/3}O_2$, for example) is excellent in the thermal stability and high also in the energy density and can be preferably used.

Here, a lithium nickel cobalt manganese composite oxide includes, other than oxides having Li, Ni, Co, or Mn as a constituent metal element, oxides containing at least one kind of metal elements (a transition metal element and/or a typical metal element other than Li, Ni, Co and Mn) other than Li, Ni, Co or Mn. The metal element like this can be one kind or two or more kinds of elements among Al, Cr, Fe, V, Mg, Ti, Zr, Nb, Mo, W, Cu, Zn, Ga, In, Sn, La and Ce. The same is applied to lithium nickel oxides, lithium cobalt oxides and lithium manganese oxides. As a lithium transition metal oxide like this (typically particle-like), a lithium transition metal oxide powder that can be prepared according to a conventional method can be used as they are. For example, a lithium transition metal oxide powder substantially made of secondary particles of which particle size at 50% accumulation ($D_{50}$) is in the range of about 1 μm to 25 μm can be preferably used as a positive electrode active material.

As a binder of the present embodiment, one kind or two or more kinds of binders that have been used for a lithium secondary battery can be used without particular restriction. Typically, various kinds of polymer materials can be preferably used. When an aqueous liquid composition is used to form a positive electrode mixture layer, for example, a polymer material capable of dissolving or dispersing in water can be preferably adopted. As polymer materials like this, cellulose-base polymers, fluororesins, vinylacetate copolymers and rubbers can be cited. More specific examples thereof include carboxymethylcellulose (CMC), hydroxypropylmethylcellulose (HPMC), polyvinyl alcohol (PVA), polytetrafluoroethylene (PTFE), tetrafluoroethylene-hexafluoropropylene copolymer (FEP), styrene butadiene rubber (SBR), and acryl acid-modified SBR resin (SBR-base latex). Alternatively, when a organic solvent-base liquid composition (organic solvent-base composition where a main component of a dispersant is an organic solvent) is used to form a positive electrode mixture layer, for example, a polymer material capable of dispersing or dissolving in an organic solvent can be preferably adopted. Examples of the polymer materials like this include polyvinylidene fluoride (PVdF), polyvinylidene chloride (PVdC), and polyethylene oxide (PEO).

A ratio of solid content of a positive electrode mixture layer-forming slurry is, although not particularly restricted, about 50% to 75% (preferably 55% to 65%, more preferably 55% to 60%). A ratio of a positive electrode active material in an entire positive electrode mixture layer is typically about 50% by weight or more (typically, 70 to 99% by weight) and preferably about 80 to 99% by weight. Further, a ratio of a binder in an entire positive electrode mixture layer can be set to about 0.1% by weight to 10% by weight, and a ratio of about 1% by weight to 5% by weight is preferable. A ratio of the conductive material in an entire positive electrode mixture layer can be set to about 1% by weight to 15% by weight, for example, and about 2% by weight to 8% by weight is preferable. When the ratio of the conductive material is too much, a weight of a positive electrode active material per unit volume decreases and in some cases, desired energy density can not be obtained. On the other hand, when a ratio of the conductive material is too small, in some cases, the conductivity of the positive electrode mixture layer may decrease to result in an increase in the internal resistance.

In the second step, the viscosity of the positive electrode mixture layer-forming slurry can be set in the range of 300 mPa·s to 5000 mPa·s (preferably 1000 mPa·s to 2000 mPa·s). The viscosity can be measured by use of, for example, a Rheometer, according to a measurement method stipulated by JISK7117. When the viscosity of a positive electrode mixture layer-forming slurry is not in the range, in the step of forming a positive electrode mixture layer described below, there is a care that coating defect may be caused or a coated slurry may droop. Further, according to a method for manufacturing of the present embodiment, when a particle size distribution of the conductive material is controlled as described above, the viscosity of a positive electrode mixture layer-forming slurry can be maintained lower than that in the related art; accordingly, a ratio of the solid content of the slurry can be increased. As a result, the method for manufacturing of the present embodiment is preferred also from the viewpoint of the productivity and reduction of environmental burden. That is, a quantity of solvent used, and a time and a quantity of heat necessary in the drying step can be preferably reduced.

In the second step, the positive electrode mixture layer-forming slurry is preferred to be free from lumps and to be dispersed uniformly. The dispersibility can be evaluated by a particle size gauge (grind gauge, also called as grind meter) stipulated in JISK5600-2-5 and JISK5701-1, for example. In the case of the positive electrode mixture slurry-forming slurry in the method for manufacturing of the present embodiment, a particle size obtained by the measurement method is preferable to be 10 μm to 100 μm, for example (preferably 10 μm to 80 μm, and more preferably 10 μm to 70 μm).

<Step for forming positive electrode mixture layer; S30>
Then, the positive electrode mixture layer-forming slurry obtained above is imparted on a positive electrode current collector to form a positive electrode mixture layer (also called as a positive electrode active material layer). An operation of imparting (here, coating) a positive electrode mixture layer-forming slurry on a positive electrode current collector can be conducted in a manner similar to that of the case where a positive electrode for a conventional general lithium secondary battery is manufactured. By use of an appropriate coating machine (slit coater, die coater, comma coater, and gravure coater), for example, a predetermined amount of the positive electrode mixture layer-forming slurry is coated on one side or both sides of the positive electrode current collector at a uniform thickness to manufacture a positive electrode mixture layer.

Here, as a material of a positive electrode current collector, a member formed mainly of a metal excellent in the conductivity such as aluminum, nickel, titanium, and stainless steel can be used. A shape of a current collector is not particularly restricted because it can vary depending on a shape of a battery that is formed with the obtained electrode. A bar-like shape, a plate-like shape, a foil-like shape and a mesh-like shape can be used. In a battery having a wound electrode body described below, a foil-like current collector of an alloy mainly made of aluminum (aluminum alloy) is used. A thickness of the foil-like current collector is not particularly restricted. However, from a balance between the capacity density of a battery and the strength of a current collector, about 5 μm to 200 μm (more preferably 10 μm to 30 μm) can be preferably used.

Thereafter, by an appropriate drying method and/or dryer, the positive electrode mixture layer is dried to remove a solvent contained in the positive electrode mixture layer-forming slurry. When the positive electrode mixture layer is dried, natural drying, hot-air, low humidity air, vacuum, infrared, far-infrared and electron beam can be used singularly or in a combination thereof. According to a preferable aspect, a drying temperature is set to about 200° C. or less (typically, 80° C. or more and less than 200° C.). Like this, a positive electrode of a lithium secondary battery can be obtained. After drying the positive electrode mixture layer-forming slurry, by properly pressing (for example, roll press method and flat plate press method), a thickness and the density of the positive electrode mixture layer can be controlled.

Next, a method for manufacturing a lithium secondary battery with a positive electrode thus obtained will be detailed. Firstly, respective constituent elements of a negative electrode will be described. A negative electrode of a lithium secondary battery is formed, the same as the positive electrode, in a manner where a negative electrode active material is mixed together with a binder to form a negative electrode mixture, the negative electrode mixture is imparted on a negative electrode current collector to form a negative electrode mixture layer (also called as negative electrode active material layer), and a solvent in the negative electrode mixture layer is removed. Here, as a material of a negative electrode current collector, copper, nickel, titanium, and stainless steel can be cited. A shape of a current collector is not particularly restricted and, a bar-like shape, a plate-like shape, a foil-like shape and a mesh-like shape can be used. In a battery having a wound electrode body described below, a foil-like current collector of copper or an alloy mainly made of copper (copper alloy) is used. A thickness of the foil-like current collector is not particularly restricted, However, from a balance between the capacity density of a battery and the strength of a current collector, about 5 μm to 200 μm (more preferably 8 μm to 50 μm) can be preferably used.

As a negative electrode active material, one kind or two or more kinds of substances used in a conventional lithium secondary battery can be used without particular restriction. Examples thereof include amorphous carbons (carbon powder), oxides such as lithium titanate (LTO), and alloys between tin (Sn) or silicon (Si) and lithium can be cited. As the amorphous carbons, graphite, non-graphitizable carbon (hard carbon), and easily graphitizable carbon (soft carbon), which at least partly include a graphite structure (layered structure), or combinations thereof can be used.

As a binder, an appropriate one can be selected from polymer materials described above as binders for the positive electrode mixture layer. For example, polyvinylidene fluoride (PVdF), polytetrafluoroethylene (PTFE) and styrene butadiene rubber (SBR) can be illustrated. Other than the above, also various kinds of polymer materials (carboxymethylcellulose (CMC), for example) that can work as a thickener of a negative electrode mixture layer-forming slurry and a conductive material can be used. Without particularly restricting, a use amount of the binder to 100% by weight of a negative electrode active material can be set to 1% by weight to 10% by weight (preferably 2% by weight to 5% by weight), for example.

Then, the particle-like negative electrode active material and a powdery material containing a conductive material, as required, are dispersed and kneaded together with an appropriate binder in a proper solvent (for example, an organic solvent such as N-methyl pyrrolidone (NMP) or an aqueous solvent such as water) to prepare a slurry-like (including paste-like and ink-like) composition (hereinafter, referred to as a "negative electrode mixture slurry"). A method where an appropriate amount of the negative electrode mixture slurry is coated on one side or both sides of a negative electrode current collector and dried can be preferably adopted. The drying can be conducted under heating, as required. After the negative electrode mixture slurry is dried, by appropriately conducting a press treatment (for example, so far known various kinds of press methods such as a roll press method, and a flat plate press method can be adopted), a thickness and the density of the negative electrode mixture layer can be controlled.

When an electrode body is prepared by laminating the positive electrode and negative electrode and housed together with an electrolyte solution in an appropriate battery case, a lithium secondary battery is formed. According to a typical configuration of a lithium secondary battery, a separator is interposed between a positive electrode and a negative electrode. As a battery case, materials and shapes of conventional lithium secondary batteries can be used. Examples of materials include relatively light metal materials such as aluminum and steel and resin materials such as PPS and polyimide resins. Further, a shape (outer shape of ease) may be, for example, cylinder, rectangle, rectangular parallelepiped, coin, and bag, without particular restriction. Further, the case may be provided with a safety mechanism such as a current cut-off mechanism (a mechanism that, during overcharging of a battery, can cut-off a current depending on an increase in inner pressure).

As an electrolyte solution of the present embodiment, one kind or two or more kinds of nonaqueous electrolyte solutions that are the same as those used in conventional lithium secondary battery can be used without particular restriction. A nonaqueous electrolyte solution like this typically has a composition where an electrolyte (lithium salt) is contained in an appropriate nonaqueous solvent. As the nonaqueous solvent, non-protonic solvents such as carbonates, esters, ethers, nitriles, sulfones, and lactones can be used. Examples thereof include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolan, diethylene glycol dimethyl ether, ethylene glycol dimethyl ether, acetonitrile, propionitrile, nitromethane, N,N-dimethylformamide, dimethylsulfoxide, sulfolane, and γ-butylolactone. Among these, nonaqueous solvents mainly made of carbonates are preferably used. For example, a nonaqueous electrolyte solution where one kind or two or more kinds of the carbonates are contained as a nonaqueous solvent and a sum total of volume of these carbonates is 60% by volume or more (more preferably 75% by volume or more, still more preferably 90% by volume or more, and substantially 100% by volume) of a volume of an entire nonaqueous solvent can be preferably used. Further, a solid-like (gel-like) electrolyte solution where a polymer is added to a liquid electrolyte solution like this may be used. Various kinds of additives (for example, a over-charging inhibitor (a compound that generates a lot of decomposed gas in an overcharging state)) may be appropriately added. Examples of the electrolytes include $LiPF_6$, LiBF4, $LiClO_4$, $LiN(SO_2CF_3)_2$, $LiN(SO_2C_2F_5)_2$, $LiCF_3SO_3$, $LiC_4F_9SO_3$, $LiC(SO_2CF_3)_3$, and $LiClO_4$. Among these, $LiPF_6$ is preferably used. A concentration of an electrolyte is not particularly restricted. However, when a concentration of an electrolyte is too low, an amount of lithium ions contained in the electrolyte solution becomes deficient and the ionic conductivity tends to decrease. Further, when a concentration of a supporting electrolyte is too high, the viscosity of an nonaqueous electrolyte solution becomes too high, and the ionic conductivity tends to decrease. Accordingly, a nonaqueous electrolyte solution containing an electrolyte at a concentration of about 0.1 mol/L to 5 mol/L (preferably, about 0.8 M/L to 1.5 mol/L) can be preferably used.

As a separator of the present embodiment, various kinds of porous sheets that are the same as those that have been used in a conventional lithium secondary battery can be used. For example, porous resin sheets (film and nonwoven fabrics) made of resins such as polyethylene (PE), polypropylene (PP), polyester, cellulose, and polyamide can be used. The porous resin sheets like this may be formed into a single layer structure or may be formed into a plural structure of two layers or more (for example, a three-layer structure where a PP layer is laminated on both sides of a PE layer). Though not particularly restricted, as characteristics of a preferable porous sheet (typically, a porous resin sheet) that is used as a separator base material, a porous resin sheet having an average pore size of about 0.001 μm to 30 μm and a thickness of about 5 μm to 100 μm (more preferably 10 μm to 30 μm) can be illustrated. The porosity of the porous sheet may be about 20% by volume to 90% by volume (preferably, 30% by volume to 80% by volume). In a lithium secondary battery (lithium polymer battery) that uses a solid electrolyte, a structure where the electrolyte works also as a separator can be formed.

Figure 2:
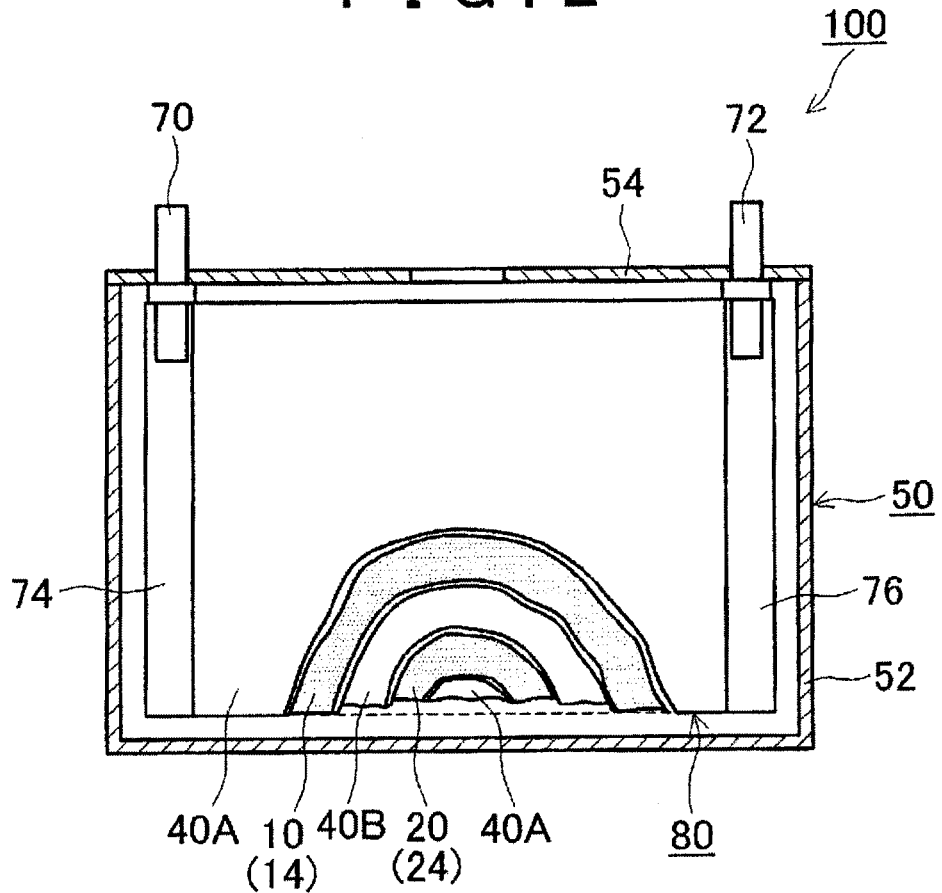
FIG. 2 is a schematic diagram illustrating a configuration of a lithium secondary battery related to an embodiment of the present invention.
Figure 3:
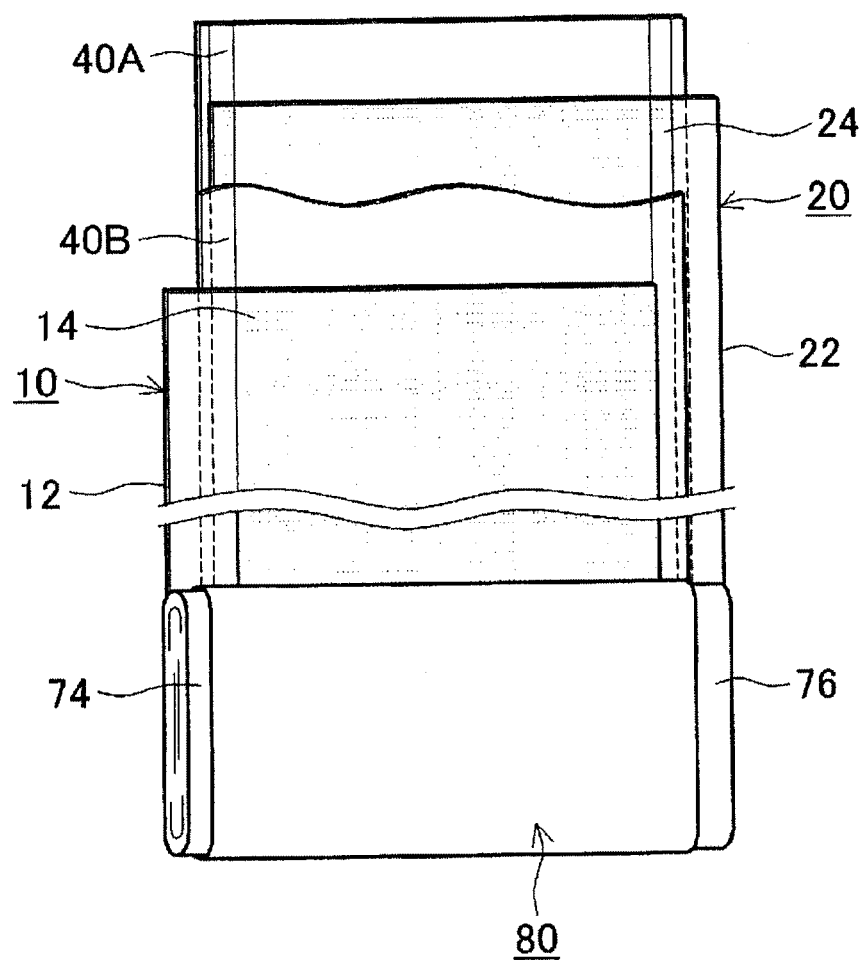
FIG. 3 is a schematic diagram showing a configuration of a wound electrode body of a lithium secondary battery related to an embodiment of the present invention.
Figure 4:
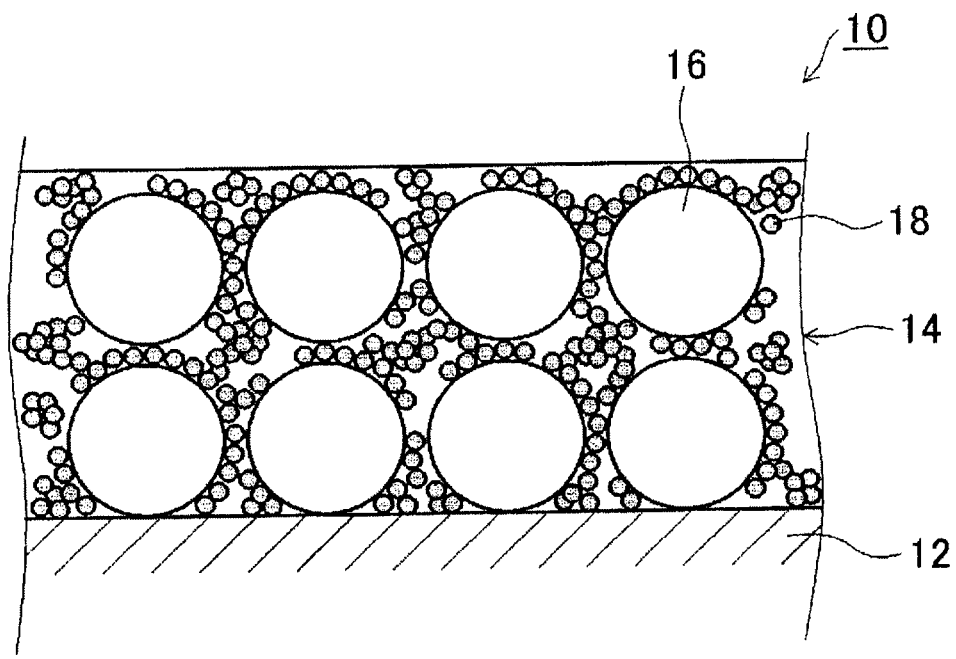
FIG. 4 is a sectional view schematically illustrating a structure of a positive electrode of a lithium ion secondary battery related to an embodiment of the present invention.

As a rough configuration of a lithium secondary battery related to one embodiment of the present invention, a lithium secondary battery (electric cell) in a form where a flat wound electrode body (wound electrode body) and a nonaqueous electrolyte solution are housed in a flat box (rectangular parallelepiped) is illustrated as an example in FIGS. 2, 3, and 4. In the following drawings, like numerals denote like elements and sites, and in some cases a repeated description thereof may be omitted or simplified. A dimensional relationship (length, width and thickness) in the respective drawings does not reflect an actual dimensional relationship.

FIG. 2 illustrates a lithium secondary battery (electric cell) 100. The lithium secondary battery 100 includes a wound electrode body 80 and a battery case 50. FIG. 3 is a drawing illustrating a wound electrode body 80. FIG. 4 is a sectional view schematically showing a structure of a positive electrode.

As schematically illustrated in FIG. 2, a lithium secondary battery 100 related to the present embodiment has a structure where an electrode body (wound electrode body) 80 in a form where a long positive electrode sheet 10 and a long negative electrode sheet 20 are flatly wound via long separators 40A and 40B is housed together with a not-shown nonaqueous electrolyte solution in a flat box-type (rectangular parallelepiped) battery case 50. The battery case 50 includes a flat rectangular parallelepiped case body 52 opened at an upper end and a cap 54 that clogs the opening. On an upper surface of the battery case 50 (that is, a cap 54), a positive electrode terminal 70 that electrically connects with a positive electrode sheet 10 of the wound electrode body 80 and a negative electrode terminal 72 that electrically connects with a negative electrode 20 of the electrode body 80 are disposed.

FIG. 3 is a diagram schematically illustrating a long sheet structure (electrode sheet) in the preceding step where a wound electrode body 80 is assembled. A positive electrode sheet 10 in which a positive electrode layer 14 is formed along a long direction on one side or both sides (typically, on both sides) of a long positive electrode current collector 12 and a negative electrode sheet 20 in which a negative electrode layer 24 is formed along a long direction on one side or both sides (typically, on both sides) of a long negative electrode current collector 22 are wound in a long direction by superposing together with two long separators 40A and 40B to prepare a wound electrode body. When the wound electrode body like this is flattened from a side surface direction to bend, a flat wound electrode body 80 is obtained. The positive electrode sheet 10 is not provided with a positive electrode layer 14 at one end that extends along a long direction (or a positive electrode layer 14 is removed) and is formed so that the positive electrode current collector 12 is exposed. Similarly, a negative electrode sheet 20 to be wound is not provided with a negative electrode layer 24 at one end that extends along a long direction thereof (or removed) and is formed so that the negative electrode current collector 22 is exposed. Then, the positive electrode terminal 70 (FIG. 2) and the negative electrode terminal 72 (FIG. 2), respectively, are electrically connected to an exposed end 74 of the positive electrode current collector 12 and an exposed end 76 of the negative electrode current collector 22.

As schematically illustrated in FIG. 4, in a positive electrode layer 14 of the positive electrode sheet 10 prepared according to the method for manufacturing, the conductive carbon fine particles 18 as a conductive material are preferably dispersed in the proximity of a positive electrode active material 16. Thereby, a positive electrode excellent in the conductivity can be obtained. In the positive electrode layer 14 like this, a particle-like positive electrode active material 16 is joined by a not-shown binder; accordingly, many fine voids are present between particles of the positive electrode active material. Many of the conductive carbon fine particles 18 are typically smaller than the particles of the positive electrode active material 16 and enter into voids of the particles of the positive electrode active material 16. Due to the conductive carbon fine particles 18 disposed between the particles of the positive electrode active material 16 like this, an excellent conductive path is formed between the particles of positive electrode active material 16, and the particles of positive electrode active material 16 and the positive electrode current collector 12 are electrically connected. Accordingly, as was described above, a preferable particle size of the conductive carbon fine particles 18 can be different also depending on a particle size of positive electrode active material 16.

Figure 5:
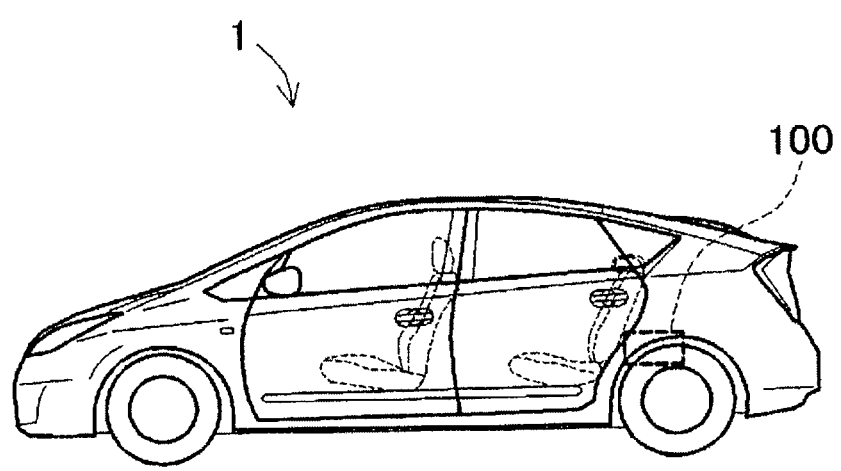
FIG. 5 is a side view schematically illustrating a vehicle (automobile) provided with a lithium secondary battery related to an embodiment of the present invention.

A lithium secondary battery manufactured according to a method for manufacturing of the present embodiment can be used in various applications. However, the lithium secondary battery is characterized in that the energy density is high and the battery resistance is reduced. Accordingly, as illustrated in FIG. 5, a lithium secondary battery 100 of the present embodiment can be preferably used as a power source (driving power source) for a motor mounted on a vehicle 1 such as an automobile. The kind of the vehicle 1 is not particularly restricted. Typical examples thereof include a plug-in hybrid vehicle (PHV), a hybrid vehicle (HV), an electric vehicle (EV), and a fuel cell vehicle (FCV). The lithium secondary battery 100 like this may be used singularly or in a form of a battery pack where a plurality of lithium secondary batteries are connected in series and/or in parallel.

In what follows, some examples related to the present invention will be described. However, the present invention is not intended to be restricted to specific examples like this.

Formulation of Lithium Secondary Battery

Example 1

In a high shear homogenizer (Type "MT-V45", manufactured by KINEMATICS), 2.3 kg of N-methyl-2-pyrrolidone (NMP) as a solvent was put, in the solvent 215 g of acetylene black (AB; trade name: DENKA BLACK POWDER, manufactured by DENKI KAGAKU KOGYO KK) was added as a conductive material, and a mixture was stirred for 15 min at the shearing speed of 30000 s$^{-3}$ to disperse the AB in the solvent (first step). Here, a particle size distribution of the conductive carbon fine particles contained in the solvent was measured by a laser diffraction particle size analyzer (type: "MT3000", manufactured by MicroTrack Co., Ltd.). Obtained results are shown in corresponding places of Table 1. In the Table, $D_{10}$, $D_{90}$ and $D_{90}/D_{10}$, respectively denote a particle size at 10% accumulation, a particle size at 90% accumulation, and a ratio ($D_{90}/D_{10}$) of the particle size at 90% accumulation ($D_{90}$) and the particle size at 10% accumulation ($D_{10}$).

A $LiNi_{1/3}Co_{1/3}Mn_{1/3}O_2$ powder (NCM; a particle size at 50% accumulation ($D_{50}$) is 10 μm) as a positive electrode active material and polyvinylidene fluoride (PVdF; trade name: "KF POLYMER #7300", manufactured by Kureha Corp) as a binder were added to a dispersing solvent of the prepared conductive carbon fine particles and dispersed by the homogenizer for 30 min at the shear speed of 30000 s$^{-1}$, thereby a positive electrode mixture layer-forming slurry-like composition (a positive electrode mixture layer-forming slurry) was obtained (second step). A ratio of the solid content in the present step was about 60% by weight and a composition ratio of solid contents of NCM as a positive electrode active material, AB as a conductive material, and PVdF as a binder was set to 93:4:3. Here, whether the obtained positive electrode mixture layer-forming slurry has the viscosity appropriate for coating was measured with a rheometer (type name: Physica MCR, manufactured by Anton Paar). Further, in order to evaluate the dispersibility of the resulted positive electrode mixture layer-forming slurry, a particle size was measured with a grind meter. The obtained results are illustrated in corresponding positions in Table 1.

Example 2 to Example 9

Except that, in the first step, a total stirring time was set to 15 min that is the same as that in example 1 and a timing for charging the AB (that is, a time until the AB is added from the start of stirring) was changed, in a manner similar to that of example 1, positive electrode mixture layer-forming slurries were prepared. The smaller the number of examples is, the faster the timing for charging the AB is, that is, the longer the stirring time after the AB was added is. Also in each of Examples 2 to 9, in a manner similar to that of example 1, a particle size distribution in the first step and the viscosity and a particle size in the second step were measured. Obtained results are illustrated in corresponding places of Table 1.

Example 10

Except that, in the first step, with a bead mill (type name: "LABSTAR LMZ06", manufactured by Ashizawa FineTech Ltd.) and with beads of ϕ0.5 mm as a crushing media, the mixture was stirred for 15 min to disperse AB in a solvent, in a manner similar to that of example 1, a positive electrode mixture layer-forming slurry was prepared. Also of Example 10, in a manner similar to that of example 1, a particle size distribution in the first step and the viscosity and a particle size in the second step were measured. Obtained results are illustrated in corresponding places of Table 1.

Comparative Example 1

As a conductive material, two kinds of carbon fine particles (specifically, a conductive material having a large specific surface area (Ketjen black (specific surface area; 1417 m$^2$/g)) and a conductive material having a small specific surface area (Super P (specific surface area; 67 m$^2$/g)) were mixed at a ratio of 25:75) were used. In the first step, in a planetary mixer (type name: "PVM-15", manufactured by AsadaTekko Co., jp), NCM as a positive electrode active material, AB as a conductive material and PVdF as a binder (weight ratio is 93:4:3 that is the same as that of example 1) were put together and stirred for 30 min at the number of rotation of 50 rpm to prepare a positive electrode mixture layer-forming slurry. Since the AB and the positive electrode active material were put together, particle size distributions thereof were not measured (N. A. in Table 1 denotes being not measured). In a manner similar to that of example 1, the viscosity and a particle size in the second step were measured. Obtained results are illustrated in corresponding places of Table 1.

Each of the positive electrode mixture layer-forming slurries obtained above was coated on both sides of a long aluminum foil (positive electrode current collector) having a thickness of about 15 μm so that a basis weight (coating weight in terms of solid content, that is, dry weight of a positive electrode mixture layer) per one side is 12.5 mg/cm² and dried to form a positive electrode mixture layer. Then, the positive electrode mixture layer was pressed so that the density thereof may be 2.45 g/cm³, thus, a positive electrode sheet was prepared (Examples 1 to 10, Comparative Example 1).

Next, natural graphite (powder) as a negative electrode active material, styrene butadiene rubber (SBR) and carboxymethylcellulose (CMC) were mixed at a weight ratio of 98.3:1.0:0.7 therebetween and these were mixed with ion exchange water so that NV may be 54% by weight, thereby an aqueous negative electrode mixture layer-forming slurry (slurry for a negative electrode mixture layer) was prepared. The slurry for a negative electrode mixture layer was coated on both sides of a long copper foil (negative electrode current collector) having a thickness of about 10 μm so that a basis weight (coating weight in terms of solid content, that is, dry weight of a negative electrode mixture layer) per one side may be 6.9 mg/cm² and dried, thus a negative electrode mixture layer was formed. Then, the negative electrode mixture layer was pressed so that the density thereof may be 1.27 g/cm³, thus, a negative electrode sheet was prepared.

The positive electrode sheet and negative electrode sheet prepared above were wound with two sheets of separators (here, a porous polyethylene sheet (PE) was used.) interposed therebetween, thereby respective electrode bodies were prepared. The electrode body like this was housed in a cylindrical battery case together with a nonaqueous electrolyte solution (here, an electrolyte solution where in a mixed solvent containing ethylene carbonate (EC), dimethyl carbonate (DMC) and diethyl carbonate at a volume ratio of 3:4:3, $LiPF_6$ as an electrolyte was dissolved at a concentration of about 1 mol/L was used). At an opening of the battery case, a cap was applied and joined by welding, thus, a 18650 type (diameter: 18 mm, height: 65 mm) lithium secondary battery (in each of Examples 1 to 10, Comparative Example 1) was formed.

Measurement of IV Resistance

To each of the above-formed batteries, at a temperature of 25° C., a proper conditioning treatment (a (CC-CV charging) operation where at a charging rate of 0.8 C, charging is performed up to 4.2 V under constant current and constant voltage, and a (CC discharging) operation where at a discharging rate of 0.8 C, discharging is performed up to 3.0 V under constant current) was applied. Thereafter, at a temperature of 25° C., the IV resistance was measured. Obtained results are shown in Table 1.

TABLE 1

| | Dispersibility in solvent Accumulative particle size of conductive material (μm) | | | Coating properties Viscosity | Dispersibility during coating Particle size | Battery characteristics IV Resistance |
|---|---|---|---|---|---|---|
| | $D_{10}$ | $D_{90}$ | $D_{90}/D_{10}$ | (mPa·s) | (μm) | (mΩ) |
| Example 1 | 0.324 | 2.394 | 7 | 2000 | 60 | 3.1 |
| Example 2 | 0.384 | 4.235 | 11 | 1850 | 60 | 2.9 |
| Example 3 | 0.314 | 6.951 | 22 | 1750 | 60 | 2.1 |
| Example 4 | 0.336 | 10.14 | 30 | 1750 | 60 | 1.8 |
| Example 5 | 0.324 | 14.18 | 44 | 1700 | 65 | 1.7 |
| Example 6 | 0.418 | 22.91 | 55 | 1600 | 80 | 1.7 |
| Example 7 | 0.497 | 39.71 | 80 | 1600 | 80 | 1.7 |
| Example 8 | 0.571 | 55.97 | 98 | 1550 | 85 | 1.7 |
| Example 9 | 0.513 | 62.32 | 121 | 1550 | 100 | 1.8 |
| Example 10 | 0.348 | 2.721 | 8 | 2100 | 60 | 3.4 |
| Comparative Example 1 | N.A. | N.A. | — | 6500 | 65 | 2.2 |

As shown in Table 1, in examples 1 and 10 where a ratio ($D_{90}/D_{10}$) of a particle size at 90% accumulation ($D_{90}$) and a particle size at 10% accumulation ($D_{10}$), which are based on a particle size distribution measurement of the conductive material, is 10 or less, values of the IV resistance higher than those of other samples were shown. The reason for this is considered that since the structural conformation of the conductive material is excessively disintegrated, the conductivity of the conductive material is deteriorated and the conductive path in the positive electrode mixture layer became narrow. From this, it was confirmed that when the $D_{90}/D_{10}$ of the conductive material is set to 10 or more, the battery characteristics can be improved. Further, in examples 3 to 9 where a particle size at 90% accumulation ($D_{90}$) based on a particle size distribution measurement of the conductive material is one half time or more (that is, a $D_{90}$ particle size is 5 μm or more) a particle size of the positive electrode active material (a particle size at 50% accumulation ($D_{50}$); 10 μm), values of the IV resistance became rapidly small. And, in examples 3 to 5 where a particle size at 90% accumulation ($D_{90}$) based on a particle size distribution measurement of the conductive material is one half time or more and two times or less of the positive electrode active material (a particle size at 50% accumulation ($D_{50}$); 10 μm), all of the battery characteristics (IV resistance), coating properties (viscosity) and the dispersibility during coating became excellent. From above results, it was shown that when the particle size of the conductive material is controlled so that voids of particles of the positive electrode active material can be effectively filled, a lithium secondary battery that can improve not only the battery characteristics (the IV resistance, for example) but also is preferable from production technology that can suppress the viscosity of slurry can be provided. In comparative example 1 where two kinds of conductive materials different in the specific surface area are mixed, since the conductive material and the active material are simultaneously added, a particle size distribution of only the conductive material is unclear. However, since the viscosity of the slurry is very high such as 6500 mPa·s, from the viewpoint of the coating properties (handling properties) and productivity, it was very difficult to prepare a positive electrode mixture layer with precision.

In the above, specific examples of the present invention were detailed. However, these are only illustrations. In the present invention, what was obtained by variously modifying and changing specific examples illustrated above can be included.

What is claimed is:

1. A method for manufacturing a lithium secondary battery comprising:

preparing a first slurry by a dispersing treatment where a conductive material of conductive carbon fine particles is dispersed in a solvent;

preparing a second slurry by mixing the first slurry, a positive electrode active material and a binder;

imparting the second slurry on a positive electrode current collector to form a positive electrode mixture layer; and forming a lithium secondary battery provided with the positive current collector on which the positive electrode mixture layer is formed;

wherein the dispersing treatment is conducted so that a ratio of a particle size at 90% accumulation of the conductive material to a particle size at 10% accumulation of the conductive material is 10 or more and 200 or less, and the particle size at 10% accumulation of the conductive material and the particle size at 90% accumulation of the conductive material are based on a particle size distribution measurement.

2. The method according to claim 1, wherein the dispersing treatment is conducted so that the ratio of the particle size at 90% accumulation to the particle size at 10% accumulation is 20 or more and 50 or less.

3. The method according to claim 1, wherein the particle size at 90% accumulation is 5 to 20 µm.

4. The method according to claim 1, wherein the particle size at 90% accumulation of the conductive material is one half or more and twice or less a particle size at 50% accumulation of the positive electrode active material which is based on the particle size distribution measurement.

5. The method according to claim 1, wherein the dispersing treatment is conducted so that the particle size at 90% accumulation of the conductive material is 5 µm or more and 60 µm or less.

6. The method according to claim 1, wherein as the conductive material, at least one kind of acetylene black, furnace black, Ketjen black, channel black, lamp black, and thermal black is used.

7. The method according to claim 1, wherein the first slurry is prepared by operating a homogenizer under a condition of a shear speed of $30000 \text{ s}^{-1}$ or more.

8. The method according to claim 1, wherein the second slurry is adjusted so that a viscosity of the second slurry is in the range of 300 mPa·s to 5000 mPa·s.

9. The method according to claim 1, wherein the second slurry is adjusted so that a ratio of the conductive material contained in a positive electrode layer is 2% by weight or more and 8% by weight or less.

10. The method according to claim 1, wherein the solvent is removed from the positive electrode mixture layer so that a ratio of the conductive material contained in a positive electrode layer is 2% by weight or more and 8% by weight or less.

11. The method according to claim 1, wherein the particle size distribution measurement is a laser diffraction/light scattering method.

12. A lithium secondary battery obtained by the method according to claim 1.

13. A vehicle, comprising:
a lithium secondary battery obtained by the method according to claim 1.

* * * * *